May 16, 1967 J. W. PLUMMER 3,320,366

COMMUNICATION METERING AND REGISTERING APPARATUS

Filed June 22, 1964 4 Sheets-Sheet 1

INVENTOR.
JAMES W. PLUMMER
BY F. J. Pisarra
ATTORNEY

INVENTOR.
JAMES W. PLUMMER
BY F. J. Pisarra
ATTORNEY

INVENTOR.
JAMES W. PLUMMER
BY
F. J. Pisarra
ATTORNEY

INVENTOR.
JAMES W. PLUMMER
BY
F. J. Pisarra
ATTORNEY

United States Patent Office 3,320,366

Patented May 16, 1967

3,320,366

COMMUNICATION METERING AND REGISTERING APPARATUS

James W. Plummer, Red Bank, N.J., assignor of fifteen percent to Douglas R. Burke, Middletown, N.J., and thirty-three and one-third percent to Roy K. Lewis, Brooklyn, N.Y.

Filed June 22, 1964, Ser. No. 376,866
7 Claims. (Cl. 179—7.1)

This invention relates to registering and metering devices, and in particular to apparatus designed for use with home or office telephones to register and record the number of calls, as well as the duration of each call, made from each given telephone.

It is an object of the present invention to provide a telephone call metering and registering apparatus which is substantially completely automatic in operation.

It is another object of the present invention to provide such call metering and registering apparatus which is adapted to be conditioned for actuation in response to a lifting of the receiver off the cradle or hook of the telephone with which the apparatus is associated.

Still another object of the present invention is the provision of a call registering and metering apparatus, as aforesaid, the time-indicating, measuring and recording mechanism of which is actuated concomitantly with the start of voice communication.

Yet another object of the present invention is the provision of such metering and registering apparatus which enables an immediately visible transient indication of the time elapsed during each call, as well as a permanent printed record of each and every call, to be obtained.

A further object of the present invention is the provision of such apparatus which facilitates the keeping of records of the use of the telephone for each month or other predetermined period, thereby to serve as a means for checking the billings for service rendered by the telephone company as well as a means for attributing proportionate shares of the overall service charges to individual users of the telephone.

Still a further object of the present invention is the provision of such apparatus equipped with means for generating periodic audible and/or visual signals to indicate to the user of the telephone each impending prolongation of the duration of the call beyond the termination of the service rate or charging period then in progress.

It is also an object of the present invention to provide a call metering and registering apparatus, as aforesaid, which is of greatly simplified construction, which can be manufactured at relatively little cost, and which can be readily adapted to and used with all types of telephone instruments.

The foregoing and other objects, characteristics and advantages of the present invention will be more clearly understood from the following detailed description thereof when read in conjunction with the accompanying drawings, in which.

Figures 3, 6:
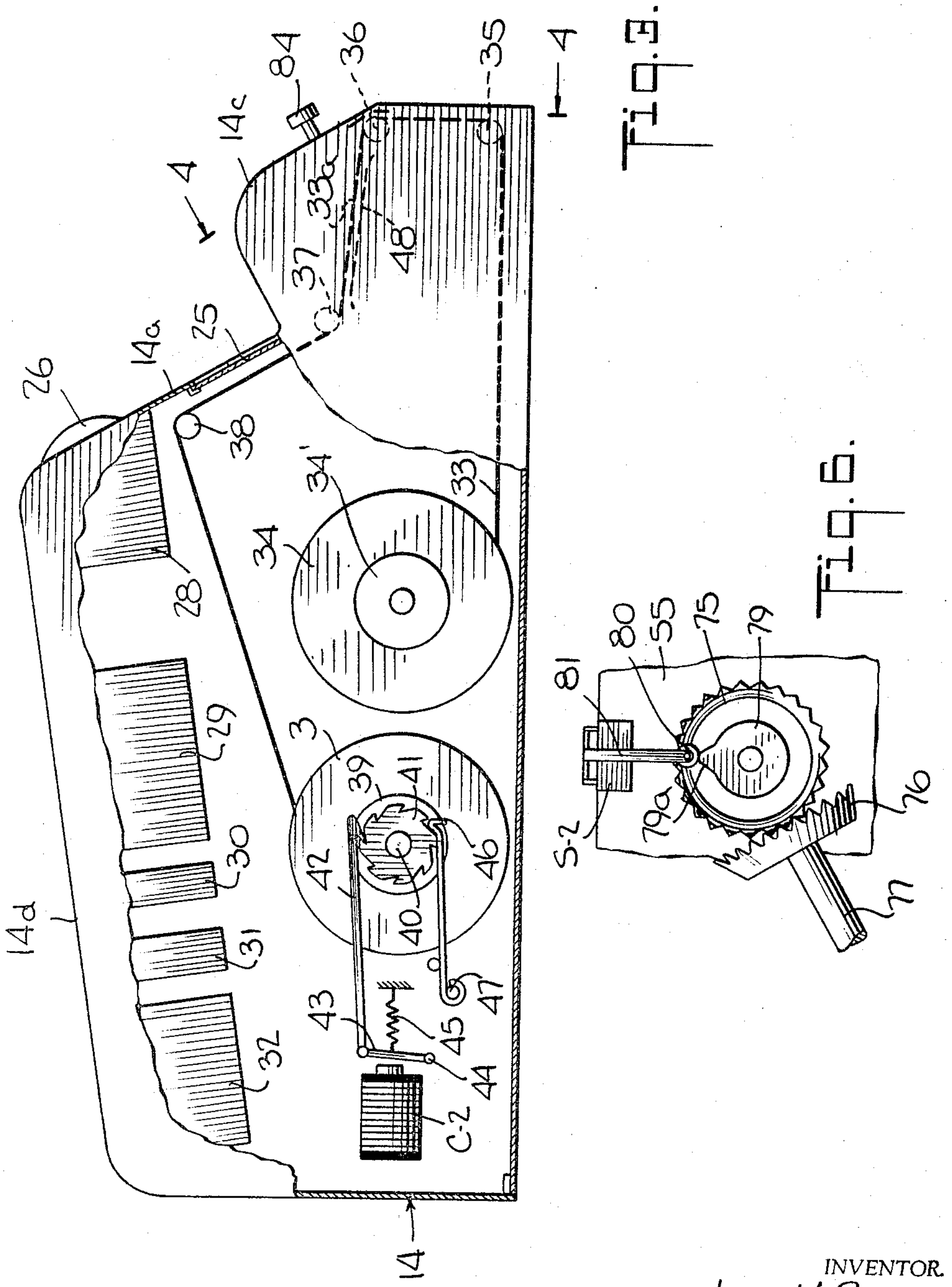
FIG. 3 is a side elevational view of the apparatus shown in FIG. 1, partly broken away to show interior details.
Figure 4:
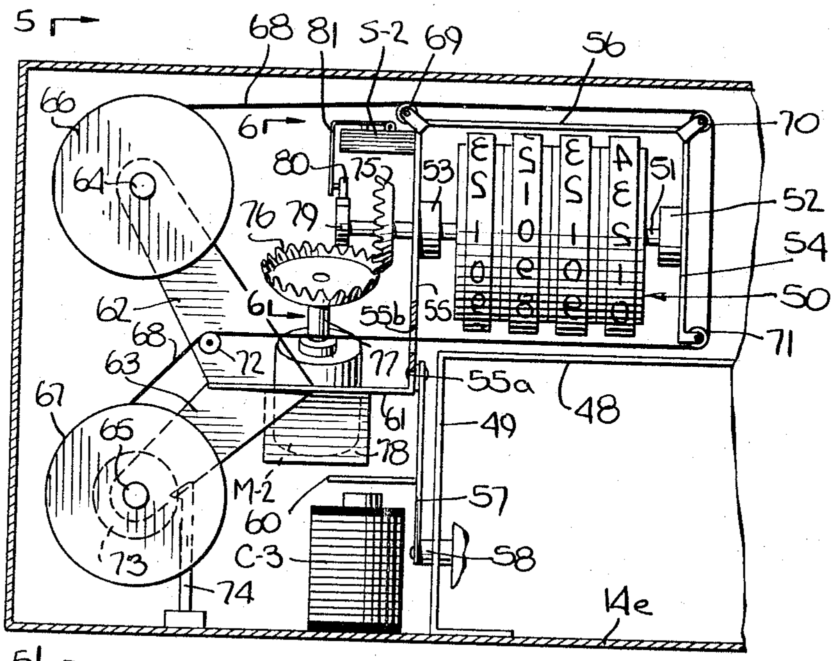
FIG. 4 is a sectional view taken along the line 4—4 in FIG. 3.
Figure 5:
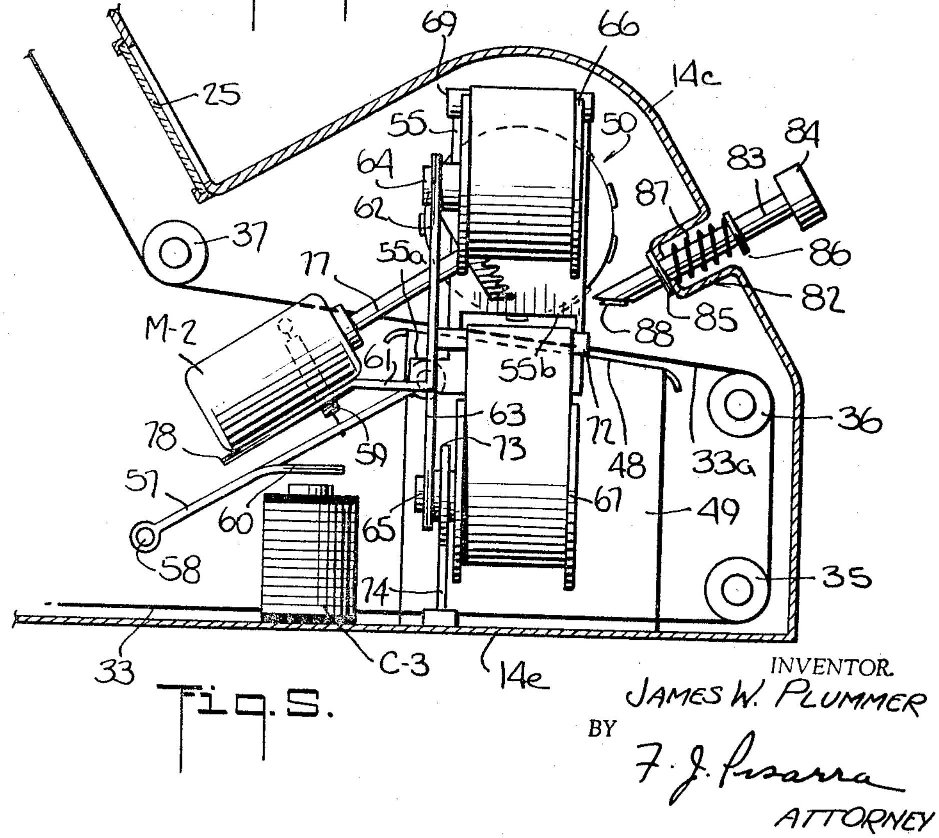
Figure 7:
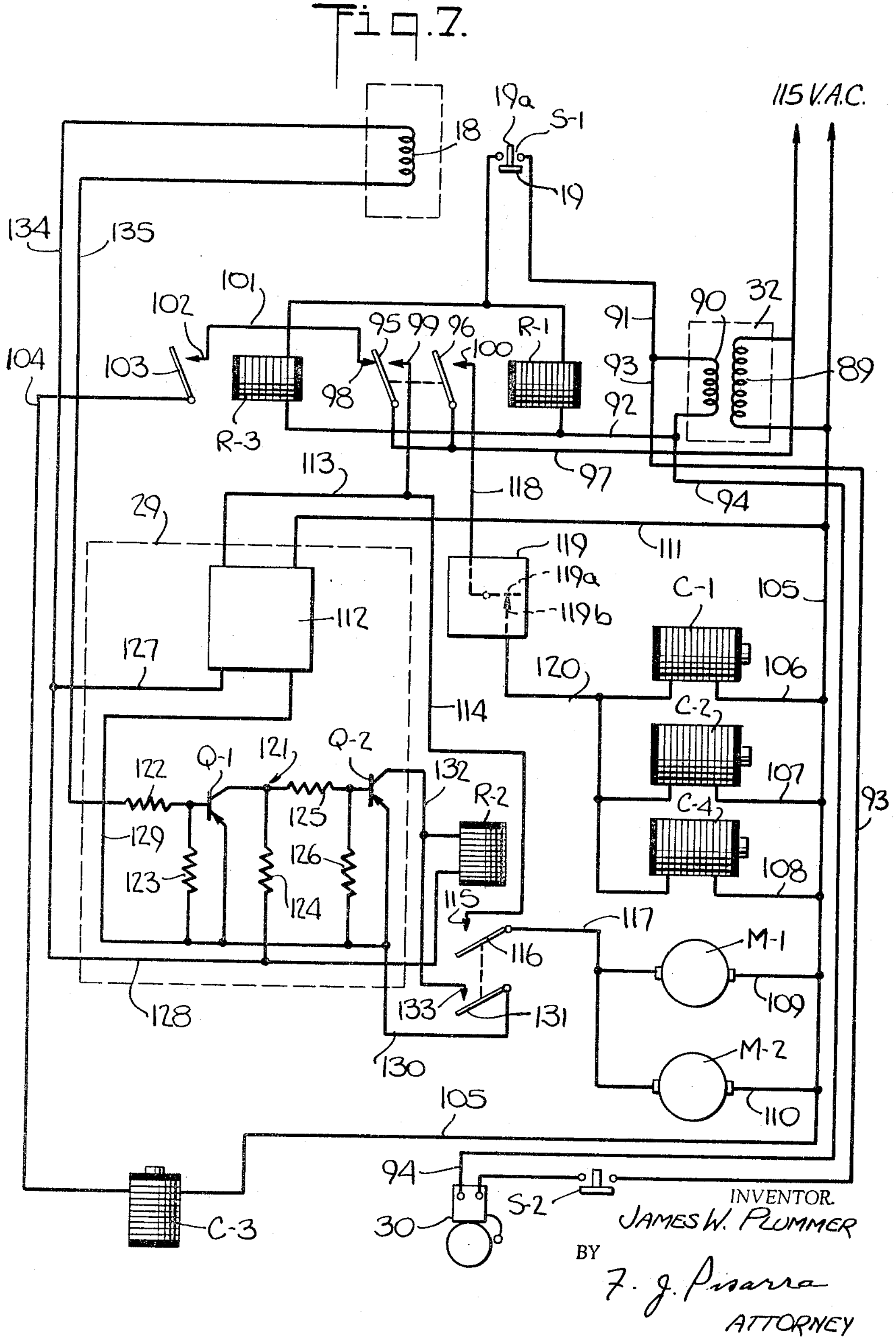

FIGS. 5 and 6 are sectional views taken along the lines 5—5 and 6—6, respectively, in FIG. 4; and FIG. 7 is a schematic electrical wiring diagram for the apparatus.

Referring now the drawings in greater detail, the call metering and registering apparatus 10 according to the present invention is illustrated (FIG. 1) as being used with a standard desk telephone 11 having a receiver or handset 12 and a cradle structure 13–13' designated to support the receiver. The apparatus 10 comprises a housing 14 and is provided with an electrical cord 15 extending therefrom and adapted to be connected to a suitable power source, e.g. a standard 115 volt A.C. line (FIG. 7). The apparatus is also provided with further electrical cables or conductors 16 and 17 extending from the housing, the former being connected to a switch S–1, and the latter to a voice current pick-up coil 18.

The switch S–1 comprises a switch member 19 (FIG. 7) having an operating plunger 19*a* projecting out of the switch housing, and an operating lever 20 pivotally mounted on the switch housing at 21 and adapted to bear against the outer end of the plunger 19*a*. Affixed to the switch housing are two spring clip elements 22 and 23 by means of which the switch can be bodily secured to the rear section of the handle grip platform 24 at the rear of the telephone 11 below the position of the receiver 12 when the same is supported by the cradle structure 13–13'.

Figures 1, 2:
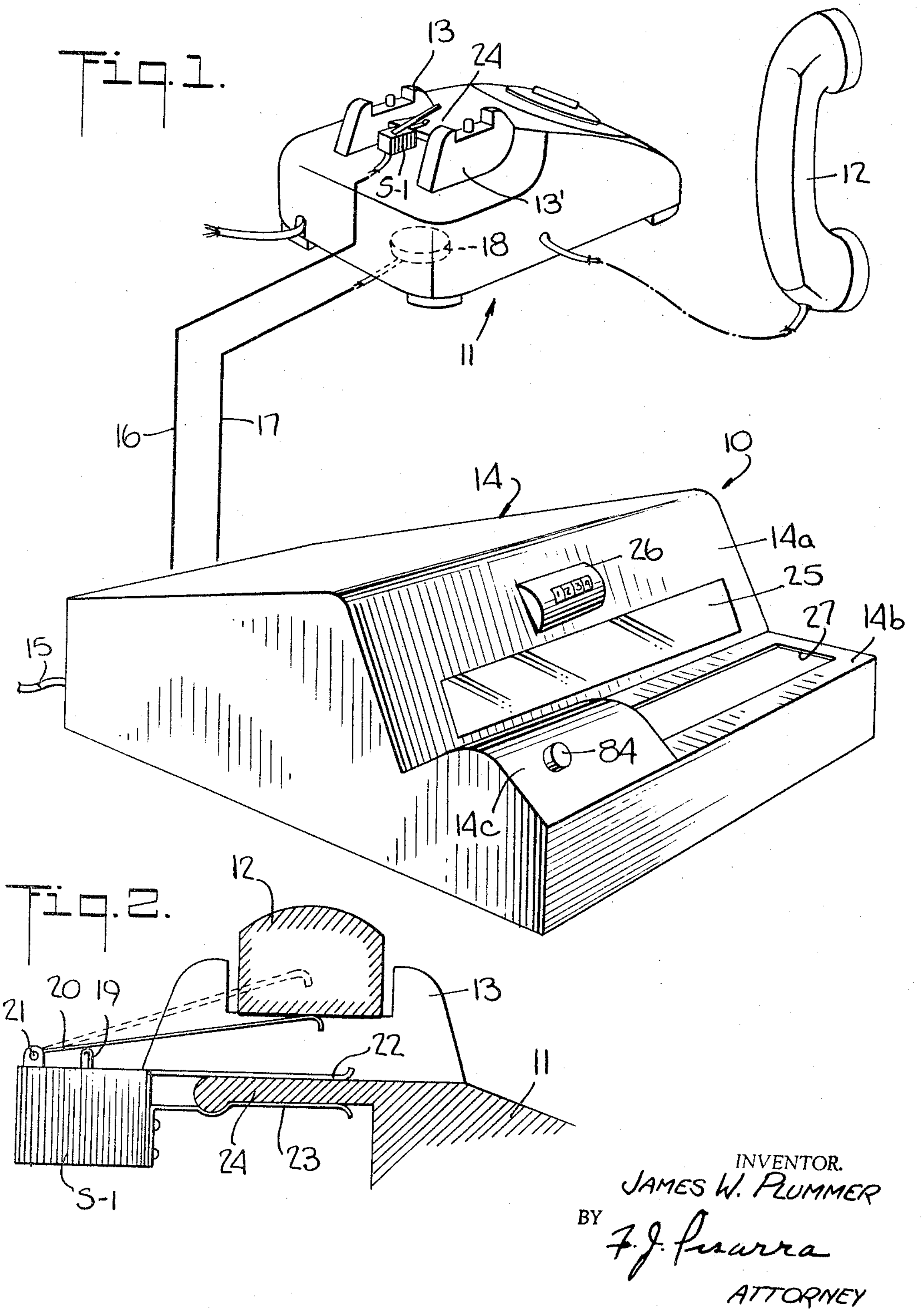
FIG. 1 is an elevational view, in perspective, of a telephone call registering and metering apparatus in accordance with the present invention and shows the same as associated with a desk telephone.
FIG. 2 is a fragmentary sectional view through the receiver-supporting cradle of the telephone of FIG. 1 and shows the main control switch for the apparatus.

As clearly shown in FIG. 2, when the switch S–1 is so mounted, the central part of the receiver 12 engages the free end of the lever 20 and depresses the same into its solid-line position so as to depress the plunger 19*a* and the switch member 19 into the "open" position thereof. It will be understood that the switch member 19 is biased so as to move into its "closed" position whenever the lever 20 and therewith the plunger 19*a* are not depressed, i.e. when the lever is in the broken-line position thereof shown in FIG. 2.

The housing 14 of the apparatus 10 is preferably made of sheet metal or the like and isp provided with a downwardly sloping front wall section 14*a* in which are arranged a flat window 25 and a curved window 26, both preferably made of a suitable transparent synthetic plastic material, such as styrene, or of glass. Frontwardly of the wall section 14*a*, the housing 14 is provided with a flat, slightly downwardly sloping wall section 14*b* having an elongated, essentially rectangular opening 27 defined therein, and with a closed and upwardly domed wall section 14*c*. The functions of these various structures will be more fully explained hereinafter.

Referring now to FIG. 3, supported from the rearwardly sloping top wall 14*d* of the housing 14 are a visual time counter 28, an amplifier and power supply module 29, a signal-emitting device 30, a relay assembly 31 and a low voltage transformer 32. The counter 28 is preferably of a standard construction calibrated in minutes and seconds of time and is so positioned within the housing that its number-bearing wheels or dials can be viewed through the window 26 in the front wall section 14*a*. The counter 28 is operatively connected with a drive motor M–1 and with a reset solenoid C–1 (FIG. 7) the manner of operation of which will be more fully described presently. For the sake of simplicity, the electrical cables 15 to 17 have been omitted from FIG. 3.

The recording medium for the apparatus 10 comprises a paper tape 33 dispensed from a supply roll 34 the core or spool 34' of which is rotatably journaled on suitable brackets (not shown) arranged in the housing 14. The paper tape is passed around idler rollers 35, 36, 37 and 38 (see also FIG. 5) and is secured at its leading end to a take-up spool 39 which is rotatably supported in the housing 14 rearwardly of the supply roll 34 by a pair of trunnions at least one of which is a rotatable shaft member 40 to which the spool 39 can be releasably keyed or otherwise fixedly connected. Integral with or otherwise fixed carried by the shaft member 40 is a ratchet wheel 41 which on one side thereof is engaged by the hooked end of a pawl 42. The latter at its other end is articulated to a short lever 43 pivotally mounted at 44 and constituting the armature of a solenoid or electromagnet C–2. A small tension spring 45 anchored at one end to a part of the housing normally biases the lever 43 and therewith the pawl 42 into the positions thereof illustrated in FIG. 3.

It will be understod, therefore, that whenever the solenoid C–2 is energized, the rachet wheel 41 and therewith the take-up roll 39 are indexed to the extent of one tooth of the ratchet wheel so as to advance the paper tape 33 by a corresponding amount, while upon subsequent deenergization of the solenoid C–2, the pawl 38 is returned to its position illustrated in FIG. 3 for engagement with the next tooth of the ratchet wheel. Any reverse movement of the latter is prevented by means of a locking dog 46 rockably mounted in the housing 14 at 47 and urged into continuous engagement with the rachet wheel in any suitable manner (not shown). It will also be understood that the supporting means for the supply roll spindle 34' will generally be provided with some type of friction or drag means to brake the rotation of the supply roll so as to prevent any uncontrolled unwinding of the paper tape.

Referring now to FIGS. 3 and 5, located at the front of the housing 14 directly under the reach 33*a* of the paper tape between the idler rollers 36 and 37 is a rigid back-up plate 48 the major part of which is coextensive with the opening 27 and thus provides a solid surface to support the paper if the user desires to write some particular notation thereon in longhand. The remainder of the back-up plate 48 extends into the confines of the portion of the housing under the domed wall section 14*c*. As clearly shown in FIGS. 4 and 5, the plate 48 is supported on legs 49 rigidly secured to the bottom wall 14*e* of the housing.

Directly above that part of the plate 48 underlying the domed wall section 14*c*, the housing accommodates a printing time counter 50 the wheels or dials of which are provided with raised numerals in conventional manner. The counter 50 is calibrated identically with the counter 28 in minutes and seconds of time. The shaft 51 of the counter 50 is rotatably journaled in bearings 52 and 53 carried by a pair of vertical frame members 54 and 55 rigidly interconnected by a cross member 56. The frame member 55 is provided in its lowermost end region with a rearwardly extending lug or ear 55*a* to which is connected one end of a supporting arm 57. The latter is rockably mounted in the housing 14 at its other end, as shown at 58, and is normally retained in the position illustrated in FIG. 5 by means of a tension spring 59. The arm 57 has a lateral extension 60 constituting the armature of a solenoid or electromagnet C–3.

The lower end of the frame member 55 is further provided with a laterally extending platform 61 to the outermost end region of which are affixed two diverging arms 62 and 63. At their remote ends, these arms carry rotatable spindles 64 and 65 designed to support, respectively, a supply spool 66 and a take-up spool 67 for an ink-coated or impregnated printing ribbon 68. The ribbon passes from the supply spool over idler rollers 69, 70 and 71 carried by the counter-supporting frame 54–55–56 and thence between the plate 48 and the printing wheels of the counter 50 to the take-up spool through an opening 55*b* in the frame member 55 and over an idler roller 72 carried by the arm 62. The spindle 65 further carries a ratchet wheel 73 cooperating with a suitably spring-biased pawl 74 for advancing the ribbon 68 in a manner still to be described.

The shaft 51 of the counter 50 extends through the bearing 53 and carries a gear 75 the teeth of which mesh with the teeth of a gear 76 affixed to the output shaft 77 of an electric motor M–2 rigidly supported on a platform 78 extending rearwardly and downwardly from the platform 61. A further extension of the shaft 51 carries a cam 79 which has a lobe 79*a* on its periphery. The cam is in constant engagement with a follower roller 80 supported by an operating arm 81 of a switch S–2 mounted on the frame member 55 and controlling the signal-emitting device 30 (shown as a bell in FIG. 7), and the arrangement is such that this switch is closed only when the roller 80 and arm 81 are lifted by the lobe 79*a* of the rotating cam 79. As in the case of the indicating counter 28, the printing counter 50 is provided with a reset solenoid C–4.

It will be understood, therefore, that whenever the framework 54–55–56 is shifted downwardly from its position illustrated in FIG. 5 upon actuation of the solenoid C–3, the wheels of the counter 50 engage the reach of the ink ribbon 68 between the rollers 71 and 72 and press the ribbon against the reach 33*a* of the paper tape to print thereon the various numerals indicating the time elapsed during the call then made.

In addition to the foregoing, at the front of the domed wall section 14*c* of the housing 14 a well 82 is defined in the bottom of which is provided an opening through which the shank 83 of a "long distance" push button 84 slidably extends. The shank 83 is provided with a pair of spaced shoulders or enlargements 85 and 86. A compression spring 87 surrounds the shank 83 between the shoulder 86 and the bottom of the well 82 and urges the push button outwardly of the housing, the extent of such outward movement being limited by the engagement of the shoulder 85 with the well bottom from within the housing. The orientation of the shank 83 is preferably such that upon inward displacement thereof a raised symbol 88, for example the letters LD, engages the ink ribbon 68 to cause said letters to be printed on the paper tape.

Referring now to FIG. 7 in particular, it will be seen that the power source, e.g. a 115 volt A.C. line, is connected across the primary winding 89 of the low voltage transformer 32. The secondary winding 90 of this transformer is connected by conductors 91 and 92 across the coils of the relays R–1 and R–3 through the intermediary of the main control switch S–1, and is also connected by conductors 93 and 94 across the signal-emitting device 30 through the intermediary of the switch S–2.

The relay R–1 has two movable contacts 95 and 96 which are connected by a conductor 97 to one terminal of the power source and of which the contact 95 cooperates with two stationary contacts 98 and 99, while the contact 96 cooperates with a stationary contact 100. The stationary contact 98 is connected by a conductor 101 to the stationary contact 102 of the relay R–3, the movable contact 103 of which is connected by a conductor 104 to one terminal of the "time-print" colenoid C–3. The second terminal of this solenoid is connected by a conductor 105 to the second terminal of the power source, which is also connected by conductors 106, 107 and 108 to one terminal of each of the solenoids C–1 (paper advance), C–2 (visual counter reset) and C–4 (printing counter reset), by conductors 109 and 110 to one terminal of each of the counter-driving motors M–1 and M–2, and by a conductor 111 to one input terminal of a low voltage power supply 112 forming a part of the amplifier and power supply module 29.

The second stationary contact 99 of the relay R–1 is connected by a conductor 113 to the second input terminal of the power supply 112, and by a conductor 114 to one stationary contact 115 of the relay R–2, which contact cooperates with a movable contact 116 connected by a conductor 117 to the second terminal of each of the timing motors M–1 and M–2. The third stationary contact 100 of the relay R–1 is connected by a conductor 118 to one side of a time delay switch device 119 the contacts 119*a* and 119*b* of which are normally closed and are arranged to open about one second after the initiation of current flow therethrough. The other side of the device 119 is connected by a conductor 120 to the second terminal of each of the solenoids C–1, C–2 and C–4.

The amplifier and power supply module 29 further includes a two-stage transistor amplifier 121 comprising two transistors Q–1 and Q–2 and a plurality of associated biasing and coupling resistors 122 to 126. One of the output terminals of the power supply 112 is connected by conductors 127 and 128 to one end of the resistor 124 and to one terminal of the coil of the relay R–2, and the other output terminal of the power supply 112 is connected by a conductor 129 to the emitters of the transistors Q–1 and Q–2 and to their respective bases through the resistors 123 and 126. The emitter of the transistor Q–2 is connected by a conductor 130 to the second movable contact 131 of the relay R–2, while the collector of the transistor Q–2 is connected by a condutcor 132 to both the coil and the second stationary contact 133 of the relay R–2. The voice current pick-up coil 18 is connected by a conductor 134 to the conductor 128 and by a conductor 135 to the base of the transistor Q–1 through the resistor 122.

The operation of the call metering and registering apparatus according to the present invention is as follows:

As a starting condition, it is assumed that the telephone 11 is not being used. The main control switch S–1 thus is open by virtue of the fact that the operating lever 20 is held in the solid-line position thereof shown in FIG. 2 by the receiver 12. All of the various relays are, therefore, deenergized and the counter-driving motors at rest. The wheels or dials of the counters 28 and 50 are still in their operated positions resulting from the last preceding call. The entire apparatus 10 is, of course, located as near as possible to the telephone 11, and the pick-up coil 18 is located directly under the telephone, as shown in FIG. 1.

When a call is to be made, the receiver 12 is lifted off the cradle structure 13–13′, whereupon the lever 20 automatically moves to its broken-line position shown in FIG. 2, permitting the main control switch S–1 to close. The output of the low voltage transformer 32 is thus applied to the relays R–1 and R–3 through the conductors 91 and 92. As these relays are energized, the movable contacts 95 and 96 of the relay R–1 are shifted from their illustrated positions into engagement with the stationary contacts 99 and 100, respectively, while simultaneously the movable contact 103 of the relay R–3 is brought into engagement with its associated stationary contact 102.

With the movable contact 95 of the relay R–1 engaging the stationary contact 99, the full line voltage is applied to the input of the power supply 112 through the conductors 97, 113 and 111. The resultant output of the power supply 112 is applied to the amplifier 121, but is just insufficient to yield an output current capable of energizing the relay R–2. At the same time, when the movable contact 96 of the relay R–1 engages the stationary contact 100, the full line voltage is applied through the conductors 97 and 18, the time delay switch device 119, and the conductors 120 and 105 to 108 to the solenoids C–1, C–2 and C–4 to energize the same. Energization of the solenoid C–1 automatically resets the dials of the visible counter 28 to zero, while simultaneously the energization of the solenoid C–4 resets the dials of the printing counter 50 to zero. Concurrently therewith, the energization of the solenoid C–2 attracts the armature lever 43 (FIG. 3) and indexes the paper tape 33 by an amount determined by the pitch of the teeth of the ratchet wheel 41 to position a fresh section 33*a* of paper beneath the printing counter (FIGS. 4 and 5) and the opening 27 (FIG. 1).

The time switch device 119 is so constructed that its contacts 119*a*–119*b* open about one second after the start of current flow therethrough to break the energization circuits for the solenoids C–1, C–2 and C–4. The pawl 42 is thus returned to its normal position into engagement with the next tooth of the ratchet wheel 41, the latter and thus the paper tape remaining stationary, of course, due to the engagement of the locking dog 46 with one of the teeth of the ratchet wheel 41 in a sense opposite to the direction of movement of the pawl 42.

The metering and registering apparatus 10 is now fully conditioned for operation but remains inactive while the caller is dialing the number he wishes to reach. As soon as voice communication is begun, however, the corresponding current flowing through the telephone circuitry is picked up inductively by the coil 18. The resulting signal voltage is thereby applied to the amplifier 121 through the conductors 134 and 135 and is amplified to an extent sufficient to enable the output signal from the transistor Q–2 to energize the relay R–2. The movable contacts 116 and 131 are, consequently, shifted into engagement with their respective stationary contacts 115 and 133. It will be apparent that the closing of the contacts 131–133 thus completes a holding circuit for the relay R–2 from the power supply 112 through the conductors 127, 128, 132, 130 and 129. The relay R–2 accordingly will stay energized, independent of the output from the amplifier 121.

As the first voice signals are picked up, the closing of the contacts 115–116 of the relay R–2 completes the energization circuit for the counter-driving motors M–1 and M–2 from the main power line through the conductor 97, the closed contacts 95–99 of relay R–1, and the conductors 114, 117, 109–110 and 105. The counters 28 and 50 thus begin to operate, the former providing a visual indication of and check on the elapsed time of the call. The operation of the counter 50 is hidden, of course, but as its wheels rotate, the cam 79 carried by the shaft 51 also rotates. During the initial part of this rotation, the follower wheel 80 rides along the major part of the circular periphery of the cam. After approximately 2½ minutes, however, the cam has rotated far enough to bring the lobe 79*a* thereof into engagement with the follower roller 80, displacing the latter and therewith the arm 81 upwardly so as to permit the switch S–2 to close. This complete the energization circuit for the signal-emitting device 30 from the secondary of the low voltage transformer 32 through the conductors 93 and 94. The signal will indicate to the user that the initial calling period is about to terminate and that an additional rate charge is impending. The signal may be a one-pulse signal, but preferably it will continue or be repeated intermittently until the shaft rotates far enough to enable the follower roller 80 to reengage the circular dwell of the cam 79.

Although the signal-emitting device 30 is herein shown to be a bell and may be of either the single stroke type or the multiple stroke type, it will be understood that the device 30 may be a buzzer or the like or may be constructed to emit a visual signal or, if desired, a combination of audible and visual signals. Likewise, the cam may be contoured otherwise than as shown, to provide repeated signals, for example.

When the call is completed and the receiver 12 replaced on the cradle structure 13–13′, the lever 20 is again depressed to its solid-line position shown in FIG. 2, whereby the switch S–1 is opened. This breaks the energization circuit for the relays R–1 and R–3, enabling the movable contacts 95 and 96 of the relay R–1 immediately to return to their starting positions, with the contact 95 reengaging the stationary contact 98. The relay R–3, however, is of a slow release type, so that the contacts 102–103 remain closed for a predetermined time interval after the deenergization of this relay.

The separation of the movable contact 95 of the relay R–1 from the stationary contact 99 breaks the energy input circuit to the power supply 112 and deactivates the same, whereby the holding current is removed from the relay R–2 to permit the movable contacts 116 and 131 thereof to return to their starting positions, and simultaneously breaks the energization circuits for the motors M–1 and M–2, stopping the counters.

During the subsequent short interval of time that the contacts 102–103 of the relay R–3 remain closed, however, an energization circuit for the solenoid C–3 is completed from the main power line through the conductor 97, the closed contacts 95–98, and the conductors 101, 104, and 105. Energization of this solenoid draws the armature 60 (FIGS. 4 and 5) downwardly and therewith the entire framework 54–55–56 in which the counter 50 is mounted. The wheels or dials of the latter are thus brought into engagement with the ink ribbon 68 and therethrough with the portion of the paper tape 33 disposed between the ribbon and the back-up plate 48 to cause the elapsed time figure to be printed on the paper tape. As soon as the movable contact 103 of the relay R–3 separates from its stationary contact 102, the solenoid C–3 is deenergized, whereby the spring 59 becomes operative to return the entire framework back to its normal position.

It will be apparent that during this reciprocation of the printing counter framework, the entire ink ribbon system moves in the same manner. Due to the relative movement between ratchet wheel 73 and pawl 74, therefore, the ink ribbon is advanced one step corresponding to the pitch of the teeth of the ratchet wheel 73.

The apparatus is now again deactivated and ready for another call. The caller will, of course, ordinarily indicate the date of the call, the number which he has called, and, if desired, also the identity of the person called and the subject matter discussed by writing such information onto the exposed portion of the paper tape accessible through the opening 27. To indicate a long distance call, the user simply depresses the push button 84 on the front part of the domed wall section **14*c* of the housing at any time after the lifting of the receiver off the cradle structure of the telephone, thereby causing the letters LD to be printed on the paper tape adjacent the location where the time figure is ultimately printed by the counter 50**.

It will thus be understood that the present invention provides means yielding a reliable record of the number of calls made and of the length of each call, which record can be used to check the periodic service charges made by the telephone company. Advantageously, therefore, a new paper tape 33 may be inserted into the apparatus 10 at the start of each billing period. Concurrently, especially in multiple-phone organizations, the invention provides a check on the number of calls emanating from, and the proportionate share of the total service charge to be attributed to, the various members or divisions of the organization. It should be noted that these advantages are not at all adversely affected by the fact that the apparatus 10 will automatically be set into operation during incoming calls as well as outgoing calls, since for any incoming call (which is not "collect") the user of the telephone will merely make an appropriate notation on the portion of the tape 33 at the opening 27 to ensure that the time value recorded at that section of the tape is not counted in when a check on the service charges is being made.

The housing 14 is, of course, constructed to facilitate access to its interior, for example to permit replacement of the record-receiving tape 33, reverse winding or replacement of the ink ribbon 68, repairs, etc. To this end, one of the side walls of the housing as well as the domed wall section **14*c* may be suitably hinged or otherwise releasably connected to the respective adjacent parts of the housing. Advantageously, the length of the ink ribbon is sufficiently great, and the magnitude of each step of its indexing movement is sufficiently small, as to ensure that a considerable period of time will pass before the ribbon is completely unwound from the supply spool 66 onto the take-up spool 67. The window 25**, which enables the printed call record to be viewed, thus provides the user with a constant opportunity to determine when the printing becomes too light, indicative of the need for either rewinding or replacing the ink ribbon.

The metering and registering apparatus according to the present invention is equally well adapted for use with wall telephones, of course, and further is usable with all types of communication systems, other than telephone systems, in which the signal energy can be picked up inductively by the coil 18 to provide a voltage or current capable of activating the time counter-driving motors M–1 and M–2. Inasmuch as the achievement of these modifications of the herein disclosed structural and operational arrangements will be readily apparent to those skilled in the art, an explicit description and illustration of such modified structural arrangements is not deemed necessary herein.

I claim:

1. A metering and registering apparatus for use with a communication device, comprising visual timer means for providing a visual indication of time elapsed during each communication, a record member, printing timer means juxtaposed to said record member and normally out of contact therewith, means for moving one of said printing timer means and record member into contact with the other to enable printing on the latter of an elapsed time of communication figure, means for indexing said record member past said printing timer means, timing motor means for identically driving said visual timer means and said printing timer means, electrical control circuit means operatively connected with all said means, main control switch means constituting a part of said control circuit means and operable, in response to preliminary activation of said communication device preparatory to the start of actual communication, to permit energization of a part of said control circuit means for setting both said visual and printing timer means to zero and for actuating said indexing means to position a fresh portion of said record member in operative relation to said printing timer means, and pick-up means arranged to sense the actual communication signals and to generate a control current in response thereto for application to said control circuit means, thereby to permit the energization of the remainder of said control circuit means and consequent actuation of said timing motor means upon sensing of the first communication signal, said control circuit means being operable, in response to and for a short time interval following the deactivation of said communication device and the consequent reversal of said main control switch means, to actuate said moving means for effecting the printing of the elapsed time of communication figure on said record member.

2. An apparatus according to claim 1, further comprising normally inactive warning signal-emitting means, auxiliary switch means constituting a part of said control circuit means and controlling said warning signal-emitting means, and means responsive to operation of one of said timer means for operating said auxiliary switch means in timed sequence after the start of actual communication to activate said warning signal-emitting means so as to indicate to the user that the elapsed time of communication is approaching a predetermined value.

3. A telephone call metering and registering apparatus, comprising a visual time for providing a visual indication of time elapsed during each call, a record member, a printing timer juxtaposed to said record member and normally out of contact therewith, a first solenoid for moving said printing timer into contact with said record member for printing on the latter an elapsed time of call figure, a second solenoid for indexing said record member past said printing timer, respective timing motors for identically driving said visual timer and said printing timer, an electrical control circuit operatively connected with said timers, said solenoids and said motors, a main control switch constituting a part of said control circuit and operable, when closed in response to the lifting of the telephone receiver preparatory to the start of voice communication, to permit energization of a part of said control circuit for setting said visual and printing timers to zero and for actuating said second solenoid to position a fresh portion of said record member adjacent said printing timer, and a pick-up coil juxtaposed to the telephone to sense the flow of voice signal currents in the latter and to generate a control current in response thereto for application to said control circuit, thereby to permit the energization of the remainder of said control circuit and consequent actuation of said timing motors upon sensing of the first voice signal current, said control circuit having incorporated therein a relay the contacts of which remain closed for a short time interval following the replacing of the telephone receiver and the consequent opening of said main control switch to permit energization of said first solenoid for effecting the printing of the elapsed time of call figure on said record member.

4. An apparatus according to claim 3, further comprising a normally inactive warning signal-emitting device, a normally open auxiliary switch controlling said warning signal-emitting device, and a cam driven by one of said timing motors, said cam being operable to close said auxiliary switch in timed sequence after the actuation of said motors to activate said warning signal-emitting device so as to indicate to the user that the elapsed call time is approaching the end of a full rate charge interval.

5. An apparatus according to claim 3, further comprising a manually operable element for printing on said record member, adjacent the location of the elapsed time figure, a legend indicating the call to be a "long-distance" call.

6. An apparatus according to claim 5, further comprising a normally inactive warning signal-emitting device, a normally open auxiliary switch controlling said warning signal-emitting device, and a cam driven by one of said timing motors, said cam being operable to close said auxiliary switch in timed sequence after the actuation of said motors to activate said warning signal-emitting device so as to indicate to the user that the elapsed call time is approaching the end of a full rate charge interval.

7. An apparatus according to claim 6, further comprising a housing, all the parts of the apparatus being enclosed within said housing with the exception of said main control switch, said pick-up coil and the actuating part of said manually operable "long distance" printing element, said housing being provided with a transparent window for viewing of said visual timer therethrough and with an opening overlying a portion of the path of travel of said record member for enabling additional notations relating to the call to be written thereon, and means for bodily mounting said main control switch on the telephone adjacent the normal rest position of the receiver, said main control switch being equipped with an operating lever adapted to be engaged by the receiver, when the latter is in said rest position thereof, for maintaining said main control switch open.

References Cited by the Examiner

UNITED STATES PATENTS

| | | | |
|---|---|---|---|
| 2,015,783 | 10/1935 | Broder | 179—7.1 |
| 3,185,769 | 5/1965 | Lombard | 179—7.1 |
| 3,185,770 | 5/1965 | Lombard | 179—7.1 |

KATHLEEN H. CLAFFY, *Primary Examiner.*

H. ZELLER, *Assistant Examiner.*